(12) United States Patent
Fukui et al.

(10) Patent No.: US 8,966,963 B2
(45) Date of Patent: Mar. 3, 2015

(54) GLOW PLUG

(75) Inventors: Katsuhiko Fukui, Tokyo (JP); Sou Matsumoto, Tokyo (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 14/115,974

(22) PCT Filed: May 15, 2012

(86) PCT No.: PCT/JP2012/062351
§ 371 (c)(1),
(2), (4) Date: Nov. 6, 2013

(87) PCT Pub. No.: WO2012/157622
PCT Pub. Date: Nov. 22, 2012

(65) Prior Publication Data
US 2014/0076039 A1 Mar. 20, 2014

(30) Foreign Application Priority Data

May 19, 2011 (JP) ................................. 2011-112468

(51) Int. Cl.
*G01M 15/08* (2006.01)
*F23Q 7/00* (2006.01)
(52) U.S. Cl.
CPC ............... *G01M 15/08* (2013.01); *F23Q 7/001* (2013.01); *F23Q 2007/005* (2013.01)
USPC ..................................................... 73/114.19
(58) Field of Classification Search
USPC ..................................................... 73/114.19
See application file for complete search history.

(56) References Cited

U.S. PATENT DOCUMENTS 6,979,801 B2 * 12/2005 Okazaki et al. ............... 219/270
7,201,043 B2 * 4/2007 Yamada et al. ............. 73/114.21
(Continued)

FOREIGN PATENT DOCUMENTS

EP 1111360 6/2004
JP 08-232825 9/1996
(Continued)

OTHER PUBLICATIONS

International Search Report for International Patent Application PCT/JP2012/062351 Mailed on Jul. 3, 2012.
(Continued)

*Primary Examiner* — Freddie Kirkland, III
(74) *Attorney, Agent, or Firm* — Amin, Turocy & Watson, LLP

(57) ABSTRACT

A glow plug includes: a heater power-conduction shaft that supplies power to a heater; a pressure detection element that is provided in an axial-direction end portion of the heater power-conduction shaft and converts pressure that the heater power-conduction shaft receives in the axial direction into an electrical signal; a first insulation member that surrounds an outer periphery of the pressure detection element with respect to the axis, and allows a signal output terminal of the pressure detection element to protrude toward an outer peripheral side of the axis; a power supply wire that is provided on an outer peripheral side of the first insulation member with respect to the axis, and is connected to the heater power-conduction shaft to supply power to the heater; a signal processing circuit that is provided on an outer peripheral side of the power supply wire with respect to the axis, and is connected to the signal output terminal to process an electrical signal of the pressure detection element; and a second insulation member that is provided between the power supply wire and the signal processing circuit, and insulates the signal processing circuit from the power supply wire.

7 Claims, 7 Drawing Sheets

(56) References Cited

U.S. PATENT DOCUMENTS

| | | | |
|---|---|---|---|
| 7,635,826 B2 * | 12/2009 | Yamada et al. | 219/270 |
| 7,759,612 B2 * | 7/2010 | Last et al. | 219/260 |
| 8,003,917 B2 * | 8/2011 | Kern et al. | 219/270 |
| 8,250,909 B2 * | 8/2012 | Kern et al. | 73/114.16 |
| 8,389,904 B2 * | 3/2013 | Pottiez et al. | 219/201 |
| 8,459,104 B2 * | 6/2013 | Cheng et al. | 73/114.19 |
| 8,567,237 B2 * | 10/2013 | Maeda et al. | 73/114.18 |
| 2004/0182144 A1 * | 9/2004 | Okazaki et al. | 73/118.1 |
| 2004/0182145 A1 * | 9/2004 | Okazaki et al. | 73/119 R |
| 2006/0032472 A1 * | 2/2006 | Yamada et al. | 123/145 A |
| 2006/0218997 A1 | 10/2006 | Yamada et al. | |
| 2007/0062267 A1 * | 3/2007 | Boucard et al. | 73/115 |
| 2007/0209625 A1 * | 9/2007 | Boucard et al. | 123/145 R |
| 2007/0295710 A1 | 12/2007 | Yamada et al. | |
| 2009/0219705 A1 | 9/2009 | Glock et al. | |
| 2009/0314061 A1 * | 12/2009 | Kern et al. | 73/35.12 |

FOREIGN PATENT DOCUMENTS

| | | |
|---|---|---|
| JP | 2001-241372 | 9/2001 |
| JP | 2005-207721 | 8/2005 |
| JP | 2006-266526 | 10/2006 |
| JP | 2010-190445 | 9/2010 |

OTHER PUBLICATIONS

Written Opinion for International Patent Application PCT/JP2012/062351 Mailed on Jul. 3, 2012.

* cited by examiner

GLOW PLUG

TECHNICAL FIELD

The present invention relates to a glow plug that is heated electrically.

BACKGROUND ART

A glow plug is known to assist starting of internal combustion engines such as diesel engines. The glow plug includes a housing, which is inserted and fixed into a through-hole formed in a cylinder of an engine; a heater, which protrudes from a tip of the housing into a combustion chamber (or auxiliary combustion chamber) of the cylinder; and a power supply shaft, which is provided in the housing and is a conductor that supplies power from an external power source to the heater. Before the starting of the engine and at the time of the starting of the engine, the heater receives power supplied from the power source in order to generate heat, thereby heating the inside of the combustion chamber and aiding the starting of the engine.

Another known glow plug has a housing in which a piezoresistive element, which receives combustion pressure in the combustion chamber from the heater, and a printed circuit board, on which a circuit that detects a resistance value of the piezoresistive element is provided, are provided (See Patent Document 1, for example).

PRIOR ART DOCUMENT

Patent Document

Patent Document 1: Japanese Laid-Open Patent Publication No. 2008-20176

DISCLOSURE OF THE INVENTION

Problems to be Solved by the Invention

However, the problem is that an expansion of the area where a circuit for detecting pressure is mounted leads to an increase in the size of the glow plug.

The present invention has been made to solve the above problem. The object of the present invention is to provide a technique for expanding the area where a circuit for detecting pressure is mounted while preventing an increase in the size of the glow plug.

Means for Solving the Problems

To solve the above problem, according to one aspect of the present invention, a glow plug includes: a heater power-conduction shaft that supplies power to a heater; a pressure detection element that is provided in an axial-direction end portion of the heater power-conduction shaft and converts pressure that the heater power-conduction shaft receives in the axial direction into an electrical signal; a first insulating insulation member that surrounds an outer periphery of the pressure detection element with respect to the axis, and allows a signal output terminal of the pressure detection element to protrude toward an outer peripheral side of the axis; a power supply wire that is provided on an outer peripheral side of the first insulation member with respect to the axis, and is connected to the heater power-conduction shaft to supply power to the heater; a signal processing circuit that is provided on an outer peripheral side of the power supply wire with respect to the axis, and is connected to the signal output terminal to process an electrical signal of the pressure detection terminal; and a second insulation member that is provided between the power supply wire and the signal processing circuit, and insulates the signal processing circuit from the power supply wire.

EMBODIMENTS FOR CARRYING OUT THE INVENTION

Hereinafter, an embodiment of the present invention will be described with reference to the accompanying drawings.

First, a glow plug of the present embodiment as a whole will be described.

Figure 1:
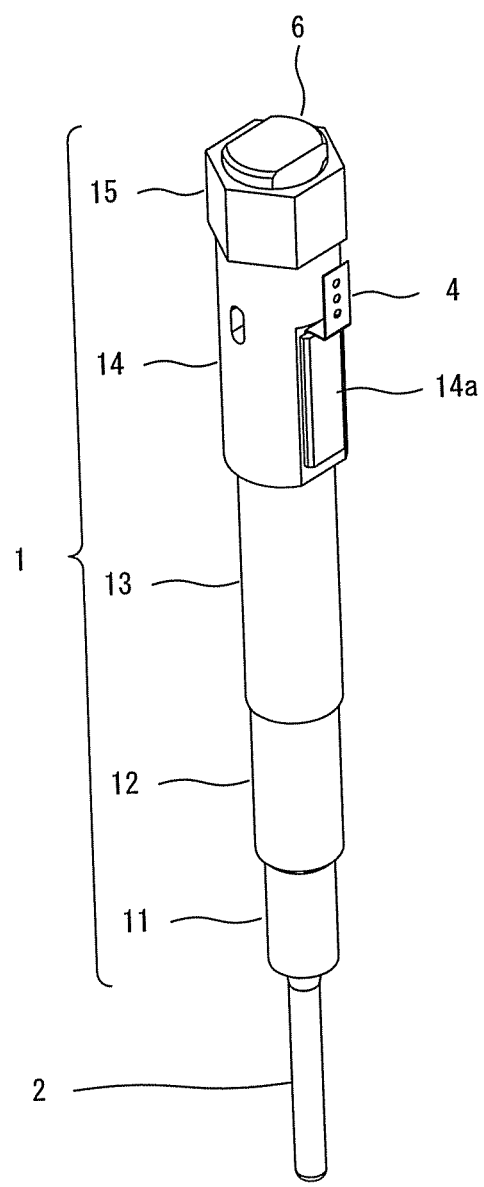
FIG. 1 is a perspective view of a glow plug.
Figure 2:
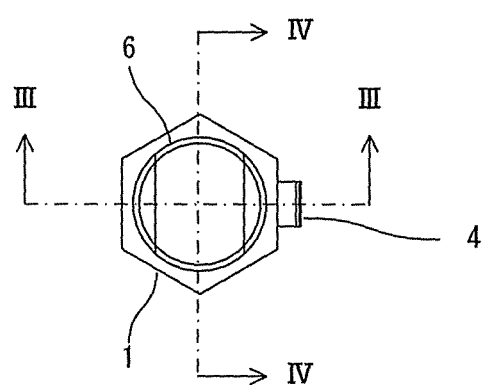
FIG. 2 is a plane view of a glow plug.
Figure 3:
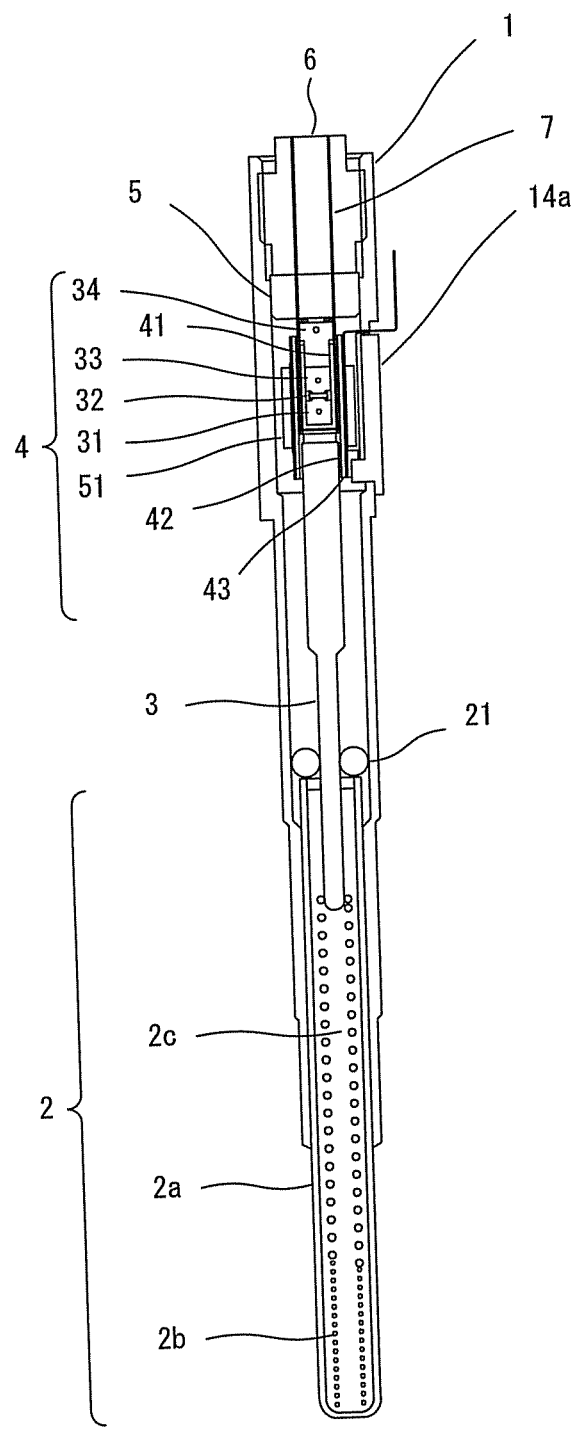
FIG. 3 is a front cross-sectional view of a glow plug.
Figure 4:
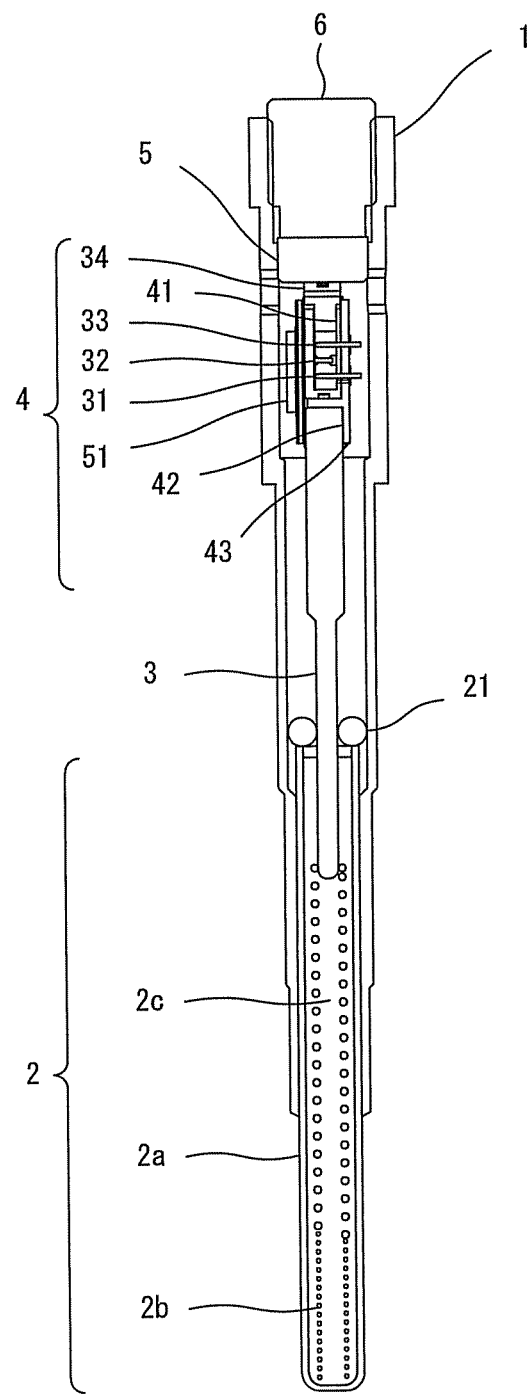
FIG. 4 is a left-side cross-sectional view of a glow plug.

FIG. 1 is a perspective view of a glow plug. FIG. 2 is a plane view of the glow plug. FIG. 3 is a front cross-sectional view of the glow plug. FIG. 4 is a left-side cross-sectional view of the glow plug. In this case, FIG. 3 is a cross-sectional view of FIG. 2 taken along arrow III-III. FIG. 4 is a cross-sectional view of FIG. 2 taken along arrow IV-IV. One end of the glow plug is inserted into a combustion chamber of a cylinder, which is not shown in the diagrams. Hereinafter, one end (or lower end in FIG. 1) of the glow plug that is disposed inside the combustion chamber will be referred to as a tip, and the other end (or upper end in FIG. 1) as a base end.

The glow plug includes a housing 1, which makes a cylindrical body; a heater 2, a top of which protrudes out of the housing 1 while a base end thereof is located inside the housing 1; a power supply shaft 3, which is provided inside the housing 1 and a tip of which is connected to the base end of the heater 2; a sensor unit 4, which is provided inside the housing 1 and a tip of which is connected to the base end of the power supply shaft 3; a spacer 5, which is provided inside the housing 1 and a tip of which is in contact with the base end of the sensor unit 4; a screw 6, which is fixed to a base end portion of the housing 1 and a tip of which is in contact with a base end of the spacer 5; and a power source wire 7, which passes through the spacer 5 and the screw 6 and extends from a tip of the spacer 5 to a base end of the screw 6. The heater 2, the power supply shaft 3, the spacer 5, and the screw 6 share a common central axis. A base end side of the power source wire 7 is connected to a power source not shown in the diagrams.

The housing 1 includes a tip section 11, which is located at the tip of the housing 1 and has an opening; a male screw section 12, a tip of which is connected to a base end of the tip section 11 and which has a male screw formed on an outer periphery thereof; a shaft housing section 13, a tip of which is connected to a base end of the male screw section 12 and which has a hollow portion through which the power supply shaft 3 passes; a sensor unit housing section 14, a tip of which is connected to a base end of the shaft housing section 13 and which has a hollow portion through which the sensor unit 4 passes; and a tool engagement section 15, a tip of which is connected to a base end of the sensor unit housing section 14 and which is located at the base end of the housing 1.

On an inner peripheral wall of a through-hole of the cylinder, a female screw is formed. The male screw section 12 is screwed into the female screw. An outer peripheral wall of the tool engagement section 15 forms a hexagonal column whose axis is the central axis, and can engage with tools such as wrenches. When the glow plug is installed in the cylinder, the heater 2 and the tip section 11 are inserted into the combustion chamber through the through-hole of the cylinder, and a tool is used to rotate the tool engagement section 15 around the central axis. As a result, the male screw section 12 is fastened to the female screw section, and the glow plug is fixed to the cylinder.

On an inner peripheral wall of the tool engagement section 15, a female screw is formed. On an outer peripheral wall of the screw 6, a male screw is so formed as to match the female screw. On an outer peripheral wall of a base end of the screw 6, two planes are so formed as to be able to engage with tools such as wrenches. When the glow plug is assembled, after the heater 2, the power supply shaft 3, the sensor unit 4, and the spacer 5 are inserted into the housing 1, a tool is used to rotate the screw 6 around the central axis, and the screw 6 is therefore fastened into the housing 1.

On a side face of the sensor unit housing section 14, an opening is formed to allow a portion of the sensor unit 4 to extend out. The opening is closed by an adapter 14a.

The heater 2 protrudes from the opening of the tip section 11 into the combustion chamber. In this example, the heater 2 is a sheath heater. The heater 2 includes a tube 2a, which forms an outer wall; a spiral heating wire 2b, which is provided in the tube 2a; and an insulator 2c, which fills the inside of the tube 2a. One end of the heating wire 2b is connected to the tip of the power supply shaft 3; the other end of the heating wire 2b is connected to the cylinder via the housing 1 and is thereby grounded. Incidentally, other systems such as ceramic heaters may be applied to the heater 2.

On the outer periphery of the power supply shaft 3, at a base-end side of the heater 2, an O-ring 21 is provided. An outer periphery of the O-ring 21 is in contact with an inner peripheral surface of the housing 1, thereby preventing combustion gas in the combustion chamber from entering the base end side of the housing 1. Incidentally, depending on a structure for mounting the heater 2 on the housing 1, it is possible to prevent the combustion gas from entering without using the O-ring 21. The housing 1 and the power supply shaft 3 are separated from one another and insulated.

The following describes the sensor unit 4.

Figure 5:
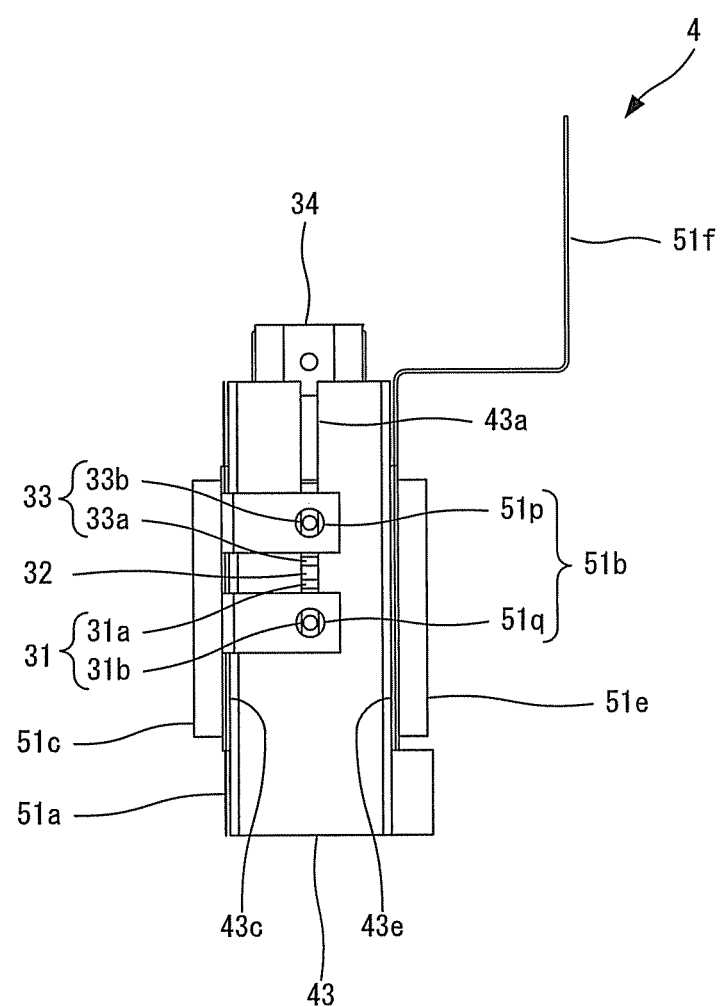
FIG. 5 is a front view of a sensor unit.
Figure 6:
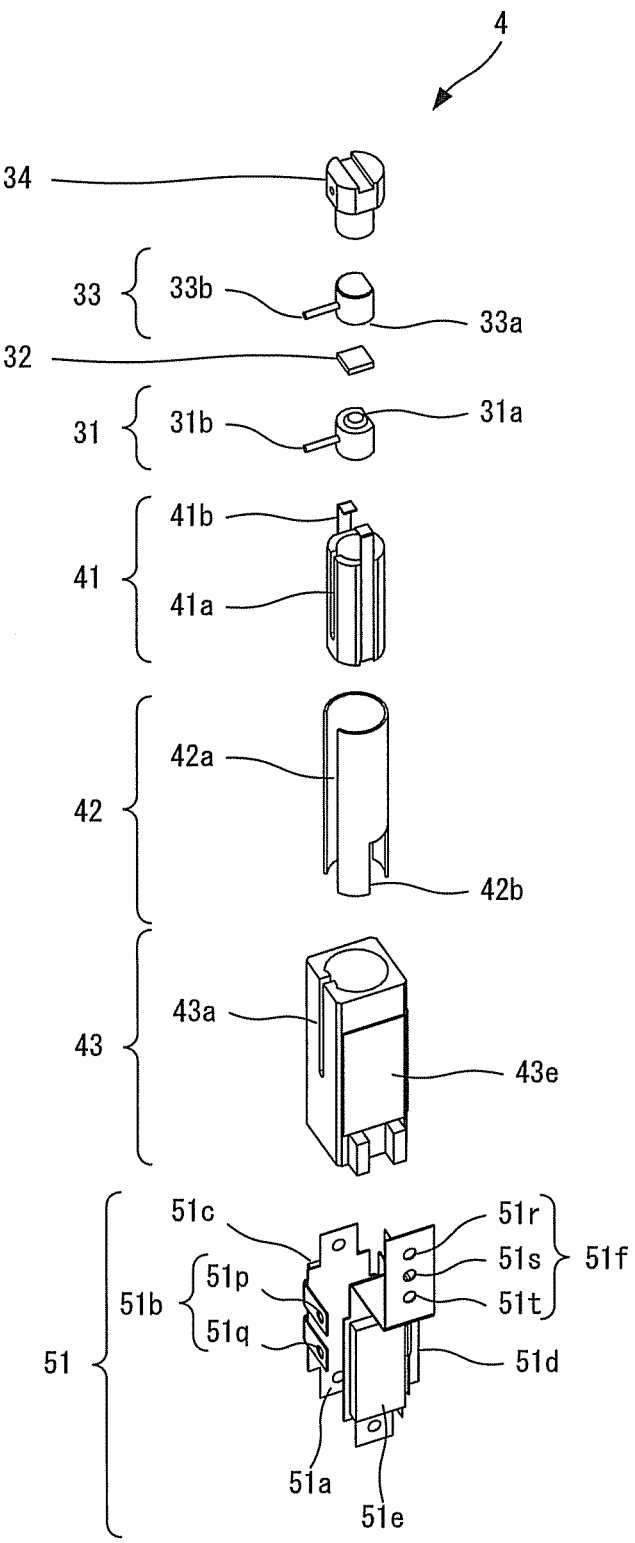
FIG. 6 is an exploded perspective view of a sensor unit.
Figure 7:
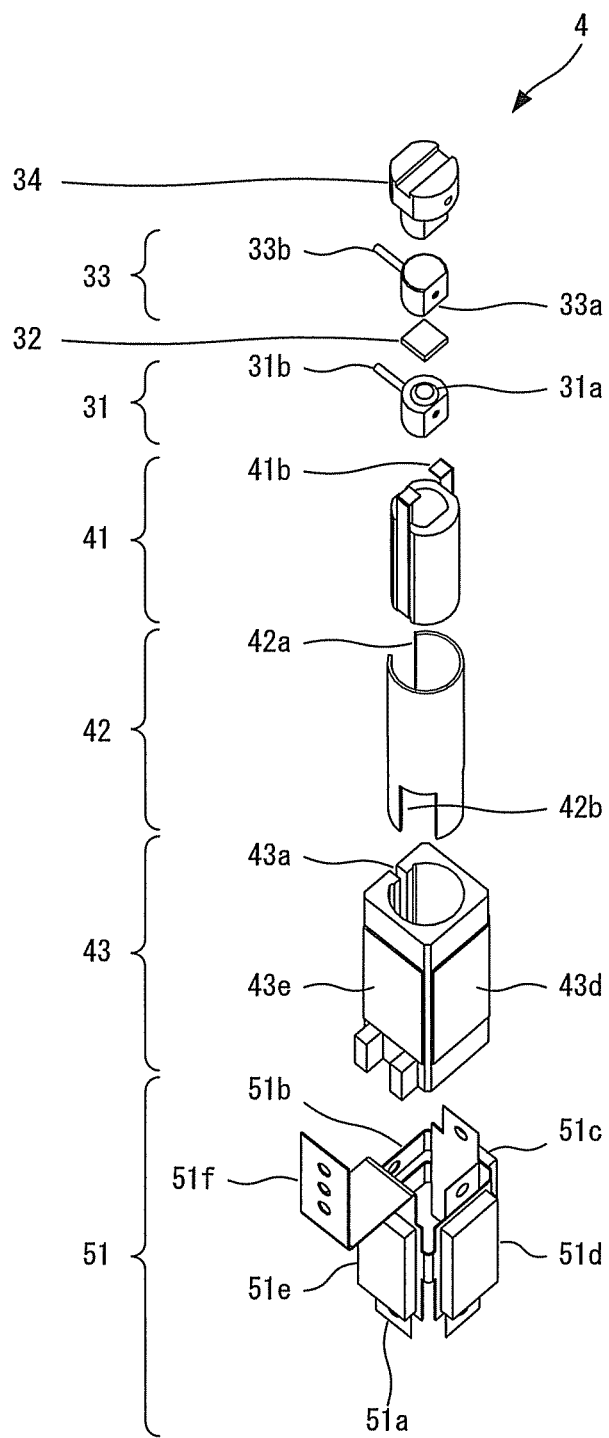
FIG. 7 is an exploded perspective view of a sensor unit when seen from a different direction.

FIG. 5 is a front view of the sensor unit 4. FIG. 6 is an exploded perspective view of the sensor unit 4. FIG. 7 is an exploded perspective view of the sensor unit 4 when seen from a different direction. The sensor unit 4 includes an electrode 31, a tip of which is in contact with a bottom surface of a guide 41; a pressure detection element 32, a tip-side surface of which is in contact with a base end of the electrode 31; an electrode 33, a tip of which is in contact with a base-end-side surface of the pressure detection element 32; a cap 34, a tip of which is in contact with a base end of the electrode 33; the guide 41, which covers outer peripheries of the electrode 31, the pressure detection element 32, and the electrode 33 with respect to a central axis; a ring 42, which is provided outside the guide 41 with respect to the central axis; a case 43, which covers an outer periphery of the ring 42 with respect to the central axis; and a signal processing circuit 51, which is provided outside the ring 42 with respect to the central axis. The electrode 31, the pressure detection element 32, the electrode 33, and the cap 34 are each provided on the central axis.

The guide 41 is an insulator that is formed into a hollow cylinder whose axis is the central axis. In a base end of the guide 41, a hook-shaped clip 41b is provided. The clip 41b is hooked on to a base end of the cap 34, and the power supply shaft 3 comes in contact with a tip of the case 43, and a bottom surface of the case 43 comes in contact with a tip side of the electrode 31. In this manner, the electrode 31, the pressure detection element 32, and the electrode 33 are held inside the guide 41. On the guide 41, a slit 41a (first slit) that is parallel to the central axis is formed. At the tip of the guide 41, a tip of the slit 41a is closed; at the base end of the guide 41, a base end of the slit 41a is opened.

The ring 42 is a conductor that is formed into a hollow cylinder whose axis is the central axis. At a position of the ring 42 that overlaps with the slit 41a, a slit 42a (second slit) that is parallel to the central axis is formed. At a tip of the ring 42, a tip of the slit 42a is opened; at a base end of the ring 42, a base end of the slit 42a is opened. That is, a cross section of the ring 42 that is perpendicular to the central axis is in the shape of a circular ring that lacks a portion thereof (C-shape).

Furthermore, at the tip of the ring 42, a notch 42b is formed. Before the power supply shaft 3 and the ring 42 are connected, the outer diameter of the base end of the power supply shaft 3 is greater than or equal to the inner diameter of the tip of the ring 42. When the power supply shaft 3 and the ring 42 are connected, the power supply shaft 3 is inserted into the tip of the ring 42, thereby widening the diameter of the notch 42b. As a result, the tip of the ring 42 covers the base end of the power supply shaft 3. In this manner, the base end of the power supply shaft 3 and the tip of the ring 42 are in surface contact, and connected by snap fitting. Moreover, the base end of the ring 42 is connected to a tip of the power source wire 7. Therefore, power from a power source is supplied to the heater 2 via the power source wire 7, the ring 42, and the power supply shaft 3. The ring 42 covers the outer periphery of the guide 41 with respect to the central axis, thereby ensuring a cross-sectional area of the conductor that allows current to flow to the heater 2. Since the base end of the power supply shaft 3 is in surface contact with the tip of the ring 42, it is possible to ensure the cross-sectional area of the conductor that allows current to flow to the heater 2.

The case 43 is an insulator that is formed into a tubular body. A cross section of an inner peripheral wall of the case 43 that is perpendicular to the central axis is in the shape of a circle a portion of which is cut by a straight line (D-shape), and engages with an outer peripheral wall of the ring 42. This engagement prevents the ring 42 from rotating around the central axis. At a position of the case 43 that overlaps with the slit 41a, a slit 43a (third slit) that is parallel to the central axis is formed. At the tip of the case 43, a tip of the slit 43a is closed; at the base end of the case 43, a base end of the slit 43a is opened. On an outer peripheral wall of the case 43, four planes are formed. On one of the four planes that is located at an outer peripheral side of the slit 42a, the slit 43a, which overlaps with the slit 42a, is formed. On the two planes adjacent to the slit 43a, substrate attachment sections 43c and 43e are respectively formed. On the plane that is the opposite side from the slit 43a, a substrate attachment section 43d is formed.

The electrode 31 includes a contact point 31a, which is located on the central axis and comes in contact with a tip-side surface of the pressure detection element 32; and a pin 31b, which protrudes in a direction perpendicular to the central axis. Similarly, the electrode 33 includes a contact point 33a, which is located on the central axis and comes in contact with a base-end-side surface of the pressure detection element 32; and a pin 33b, which protrudes in a direction perpendicular to the central axis. The pins 31b and 33b pass through the slit 41a to protrude out of the guide 41, and pass through the slit 42a to protrude out of the ring 42, and pass through the slit 43a to protrude out of the case 43. The slit 42a is greater in width than the slits 41a and 43a. Therefore, the pins 31b and 33b and the ring 42 are separated from one another and insulated.

In the guide 41, the base end of the slit 41a is opened. Therefore, when assembled, the electrode 31, the pressure detection element 32, and the electrode 33 can be inserted into the guide 41 from the base-end side. Moreover, in the ring 42, the base end of the slit 42a is opened. Therefore, when assembled, the guide 41 in which the electrode 31, the pressure detection element 32, and the electrode 33 are installed can be inserted into the ring 42 from the base-end side. Moreover, in the case 43, the base end of the slit 43a is opened. Therefore, when assembled, the ring 42 in which the electrode 31, the pressure detection element 32, and the electrode 33 are installed can be inserted into the case 43 from the base-end side.

The signal processing circuit 51 includes a flexible printed circuit 51a, which is wound around the outer periphery of the case 43 with respect to the central axis; a first connection section 51b, which is provided at one end of the flexible printed circuit 51a; a partial circuit 51c, which is connected to the first connection section 51b via the flexible printed circuit 51a; a partial circuit 51d, which is connected to the partial circuit 51c via the flexible printed circuit 51a; a partial circuit 51e, which is connected to the partial circuit 51d via the flexible printed circuit 51a; and a second connection section 51f, which is connected to the partial circuit 51d via the flexible printed circuit 51a and is provided at the other end of the flexible printed circuit 51a.

An inner-peripheral-side surface of the flexible printed circuit 51a is bonded to the substrate attachment sections 43c, 43d, and 43e. On a portion of the flexible printed circuit 51a that is at an outer peripheral side of the substrate attachment section 43c, the partial circuit 51c is provided. On a portion of the flexible printed circuit 51a that is at an outer peripheral side of the substrate attachment section 43d, the partial circuit 51d is provided. On a portion of the flexible printed circuit 51a that is at an outer peripheral side of the substrate attachment section 43e, the partial circuit 51e is provided. The first connection section 51b is in close contact with the slit 43a. The second connection section 51f extends out of the sensor unit housing section 14 through a gap between the opening of the sensor unit housing section 14 and the adaptor 14a, and is connected to a control device not shown in the diagrams. The control device is, for example, ECU (Engine Control Unit).

The first connection section 51b includes element connection terminals 51p and 51q, with a through-hole formed in each of the terminals 51p and 51q. The pin 33b which protrudes from the case 43 is connected to the through-hole of the element connection terminal 51p. Similarly, the pin 31b which protrudes from the case 43 is connected to the through-hole of the element connection terminal 51q. The above configuration allows a charge signal output from the pressure detection element 32 to be supplied to the element connection terminals 51p and 51q. The second connection section 51f includes a power source terminal 51r, a ground terminal 51s, and a signal terminal 51t, with a through-hole formed in each of the terminals 51r, 51s, and 51t. The power source terminal 51r is connected to a power supply terminal of the control device, and receives power that is supplied from the control device to the signal processing circuit 51. The ground terminal 51s is connected to a reference potential. The signal terminal 51t is connected to a signal input terminal of the control device, and outputs results of processing by the signal processing circuit 51 to the control device. The partial circuits 51c, 51d, and 51e each are designed to realize some of the functions of the signal processing circuit 51.

The guide 41 insulates the electrode 31, the pressure detection element 32, and the electrode 33 from the ring 42. The case 43 insulates the ring 42 from the signal processing circuit 51. Because of the above configuration, a path of a signal from the pressure detection element 32 is insulated from a route of power to the heater 2.

The base-end-side surface of the pressure detection element 32 is fixed to the cylinder through the electrode 33, the cap 34, the spacer 5, the screw 6, and the housing 1. The combustion pressure in the combustion chamber presses the tip-side surface of the pressure detection element 32 in a base-end direction via the heater 2, the power supply shaft 3, and the electrode 31. As a result, the pressure detection element 32 is compressed in a central-axis direction, generating a charge signal between the electrodes 31 and 33 that varies according to the displacement of the tip-side surface. The signal processing circuit 51 is, for example, a charge amplifier, which converts a weak charge signal output from the pressure detection element 32 into a voltage signal and outputs the voltage signal to the control device.

The ring 42, which is a wire for power to the heater 2, is so provided as to cover the outer periphery of the pressure detection element 32 with respect to the central axis. The signal processing circuit 51 is so provided as to cover the outer periphery of the ring 42 with respect to the central axis. Therefore, it is possible to prevent an increase in the diameter of the sensor unit 4 and the glow plug.

The flexible printed circuit 51a is wound around the case 43. Therefore, the partial circuits 51c, 51d, and 51e are provided on the outer peripheral wall of the case 43. Compared with the case where circuit components of the signal processing circuit 51 are mounted on one rigid printed circuit, the diameter of the glow plug can be decreased in the case of the present embodiment. Compared with the case where circuit components of the signal processing circuit 51 are mounted on one rigid printed circuit, the mounting area of the signal processing circuit 51 can be increased in the case of the present embodiment if the diameter of the glow plug is made equal. Therefore, there is no need to use expensive integrated circuits, such as ASIC (Application Specific Integrated Circuit), to make the signal processing circuit 51 small in size, and it is possible to reduce the cost of the signal processing circuit 51.

A first insulation member is, for example, the guide 41. Incidentally, on the first insulation member, instead of slits, openings or notches of other shapes may be formed. The first insulation member may be realized by a plurality of insulators. In this case, between a plurality of insulators of the first insulation member, pins 31b and 33b may go through. A power supply wire is, for example, the ring 42. Incidentally, on the power supply wire, instead of slits, openings or notches of other shapes may be formed. The power supply wire may be realized by a plurality of conductors each of which connects the power source wire 7 and the power supply shaft 3. In this case, between a plurality of conductors of the power supply wire, pins 31b and 33b may go through. A second insulation member is, for example, the case 43. Incidentally, on the second insulation member, instead of slits, openings or notches of other shapes may be formed. The second insulation member may be realized by a plurality of insulators. In this case, between a plurality of insulators of the second insulation member, pins 31b and 33b may go through.

As the material of the pressure detection element 32, for example, piezoelectric material such as zinc oxide is used. According to the present embodiment, the contact point 31a of the electrode 31 and the contact point 33a of the electrode 33 each are in contact with upper and lower surfaces (C-planes) that are perpendicular to a polarization axis of zinc oxide which is the pressure detection element, or in contact with a so-called crystal face orientation (0, 0, 0, 1) plane. The present embodiment makes use of the characteristics (piezoelectric longitudinal effect) of generating electrical charges on the C-planes when zinc oxide is compressed in a polarization-axis direction. As piezoelectric materials having similar piezoelectric longitudinal effects, the following are available: crystal, lithium niobate, lithium tantalate, barium titanate, lead titanate, lead zirconate titanate, and lead niobate. As in the case of the present embodiment, it is possible to detect the pressure with great sensitivity as the electrodes 31 and 33 are disposed on the upper and lower surfaces that are perpendicular to the polarization axis. As the material of the spacer 5, cap 34, guide 41, and case 43, for example, resin such as polyphenylene sulfide is used. As the material of the screw 6, adaptor 14a, and electrodes 31 and 33, for example, steel material such as sulfur free cutting steel is used. As the material of clip 41b, for example, steel material such as stainless steel is used. As the material of the ring 42, for example, material that is high in electrical conductivity, such as phosphorus deoxidation copper, is used. As the material of the housing 1, for example, steel material such as carbon steel is used. As the material of the O-ring 21, for example, rubber such as fluoro-rubber is used.

Furthermore, what is disclosed in the above embodiment is a glow plug including: a heater power-conduction shaft that supplies power to a heater; a pressure detection element that is provided in an axial-direction end portion of the heater power-conduction shaft and converts pressure that the heater power-conduction shaft receives in the axial direction into an electrical signal; a signal processing circuit that processes an electrical signal of the pressure detection element; a first insulating insulation member that surrounds the pressure detection element and allows a signal output terminal of the pressure detection element to protrude toward an outer peripheral side; a power supply wire that is provided on an outer periphery of the first insulation member, and includes a tubular portion in which a first slit is so formed as to allow the signal output terminal to pass therethrough, and is connected to the heater power-conduction shaft to supply power to the heater; a second insulation member that covers an outer peripheral surface of the power supply wire, and has the same axis as the heater power-conduction shaft, and is a tubular body in which a second slit is so formed as to allow the signal output terminal to pass therethrough; and a flexible printed circuit that is wound around an outer peripheral surface of the second insulation member and on which the signal processing circuit is formed, wherein the signal output terminal that protrudes toward an outer peripheral side of the first insulation member passes through the first slit to protrude toward an outer peripheral side of the power supply wire, and passes through the second slit to protrude toward an outer peripheral side of the second insulation member, and is connected to the signal processing circuit.

EXPLANATION OF REFERENCE SYMBOLS

1: Housing
2: Heater
3: Power supply shaft
4: Sensor unit
5: Spacer
6: Screw
11: Tip section
12: Male screw section
13: Shaft housing section
14: Sensor unit housing section
14a: Adapter
15: Tool engagement section
21: O-ring
31: Electrode
31a: Contact point
31b: Pin
32: Pressure detection element
33: Electrode
33a: Contact point
33b: Pin
34: Cap
41: Guide
41a: Slit
41b: Clip
42: Ring
42a: Slit
43: Case
43a: Slit
43c, 43d, 43e: Substrate attachment section
51: Signal processing circuit
51a: Flexible printed circuit
51b: First connection section
51c, 51d, 51e: Partial circuit
51f: Second connection section
51p, 51q: Element connection terminal
51r: Power source terminal
51s: Ground terminal
51t: Signal terminal

The invention claimed is:

1. A glow plug, comprising:
a heater power-conduction shaft that supplies power to a heater;
a pressure detection element that is provided in an axial-direction end portion of the heater power-conduction shaft and converts pressure that the heater power-conduction shaft receives in the axial direction into an electrical signal;
a first insulation member that surrounds an outer periphery of the pressure detection element with respect to the axis, and allows a signal output terminal of the pressure detection element to protrude toward an outer peripheral side of the axis;
a power supply wire that is provided on an outer peripheral side of the first insulation member with respect to the axis, and is connected to the heater power-conduction shaft to supply power to the heater;
a signal processing circuit that is provided on an outer peripheral side of the power supply wire with respect to the axis, and is connected to the signal output terminal to process an electrical signal of the pressure detection element; and
a second insulation member that is provided between the power supply wire and the signal processing circuit, and insulates the signal processing circuit from the power supply wire.

2. The glow plug according to claim 1, wherein the signal output terminal includes two terminals between which the pressure detection element is sandwiched in the axial direction.

3. The glow plug according to claim 2, wherein:
the first insulation member is a tubular body in which a first slit that is parallel to the axis is formed; and
the two terminals pass through the first slit to protrude toward the outer peripheral side of the axis.

4. The glow plug according to claim 2, wherein:
the power supply wire is a tubular body in which a second slit that is parallel to the axis is formed; and
the two terminals pass through the second slit to protrude toward an outer peripheral side of the axis.

5. The glow plug according to claim 2, wherein:
the second insulation member is a tubular body in which a third slit that is parallel to the axis is formed; and
the two terminals pass through the third slit to protrude toward an outer peripheral side of the axis.

6. The glow plug according to claim 1, wherein:
on an outer peripheral wall of the second insulation member with respect to the axis, a plurality of planes are formed;
the signal processing circuit includes a plurality of partial circuits; and
the plurality of partial circuits are each provided on the plurality of planes.

7. The glow plug according to claim 1, wherein:
the signal processing circuit includes a flexible printed circuit; and
the flexible printed circuit is wound around an outer peripheral wall of the second insulation member with respect to the axis.

* * * * *